United States Patent

Huneke

[15] 3,704,728

[45] Dec. 5, 1972

[54] MIXING VALVE FOR FLUIDS
[72] Inventor: Egon Huneke, Hemer, Germany
[73] Assignee: Friedrich Grohe Armaturenfabrik, Hemer/Brepl, Germany
[22] Filed: Dec. 10, 1970
[21] Appl. No.: 97,473

[30] Foreign Application Priority Data

Dec. 11, 1969 Germany..................P 19 62 026.9

[52] U.S. Cl. .........137/636.1, 137/625.4, 137/636.4, 251/254
[51] Int. Cl..............................................F16k 11/14
[58] Field of Search.....137/636, 636.1, 636.4, 637.4, 137/625.4; 251/252–256, 262

[56] References Cited

UNITED STATES PATENTS

| 3,126,914 | 3/1964 | Dombre | 137/636 X |
| 3,420,272 | 1/1969 | Corlett | 137/636.4 X |

FOREIGN PATENTS OR APPLICATIONS

| 1,015,290 | 9/1957 | Germany | 137/625.4 |

Primary Examiner—Martin P. Schwadron
Assistant Examiner—Richard Gerard
Attorney—Michael S. Striker

[57] ABSTRACT

A valve housing has an internal mixing chamber and an elongated passage rising from the mixing chamber. At least two fluid conduits open at the bottom wall of the mixing chamber and communicate with the latter so as to discharge fluid under pressure thereinto. A valve arrangement includes a member of arcuately segmental shape which is provided at its opposite ends with valve members accommodated in the open ends of the conduits and capable of being deflected from the closed position in which they stop fluid flow, to open positions in which they are located farther in the mixing chamber and permit the fluid flow into the same. A valve control element is mounted in the passage and is turnable as well as axially displaceable therein, having a lower end face constructed as a cam face and capable of engaging the valve members in a sense moving them to closed position, or retracting therefrom in a sense permitting the valve members to be displaced by the pressure of fluid in the conduits to positions in which they are spaced at different distances from the openings of the conduits and permit the fluid flow out of the conduits into the mixing chamber at different rates.

14 Claims, 8 Drawing Figures

PATENTED DEC 5 1972

INVENTOR
EGON HUNEKE

BY
ATTORNEY

PATENTED DEC 5 1972　　　　　　　　3,704,728
SHEET 2 OF 2
FIG. 3
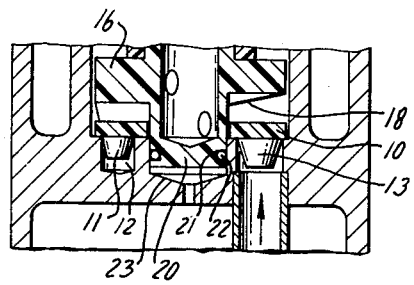
FIG. 4
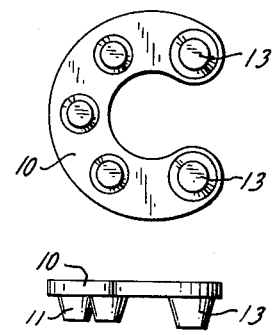
FIG. 5
FIG. 3A
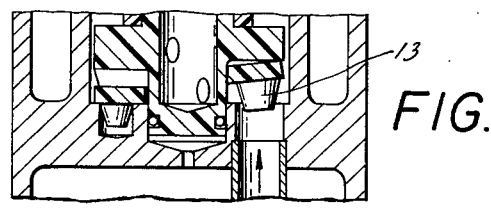
FIG. 6
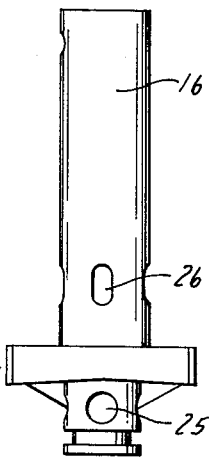
FIG. 7
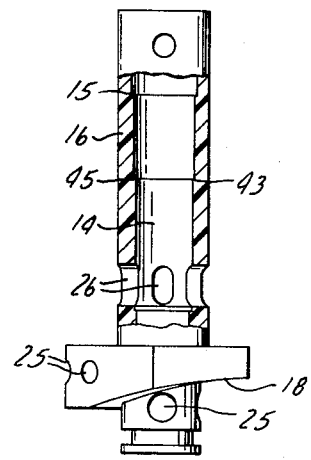
INVENTOR
EGON HUNEKE
BY
ATTORNEY

MIXING VALVE FOR FLUIDS

BACKGROUND OF THE INVENTION

The present invention relates generally to a valve, and more particularly to a mixing valve for fluids.

Such valves are already known and are used, for instance, in providing for admixture of hot and cold water in kitchen and bathroom installations. One known construction has a housing in which a control piston is turnable and in which the turning of the control piston opens and closes flow-through apertures for the fluids, that is the water, to different extents. This construction, however, has certain disadvantages. On the one hand it is not readily possible to provide a fine adjustment of the water temperature which is usually desired for such kitchen or bathroom applications, namely temperatures on the order of between substantially 30° and 42°C, and on the other hand the control piston requires O-ring seals which must be provided on its circumference and which are difficult to accommodate because of their lack of space. Also, and particularly because of the provision of the seals but also because of other features, the known construction is rather complicated and subject to malfunctions.

SUMMARY OF THE INVENTION

It is accordingly, an object of the present invention to provide an improved mixing valve of the type under discussion.

More particularly it is an object of the present invention to provide such an improved mixing valve which makes it possible to effect regulation of the desired mixed-water temperature of between substantially 30° and 42°C with a considerably greater range of accuracy than is possible with the known construction discussed above.

A further object of the present invention is to provide a very simple and highly reliable mixing valve of the type under discussion.

A concomitant object of the invention is to provide such a construction which is inexpensive in terms of technical and financial expenditure, and also much less subject to malfunction than what is heretofore known in this field.

In pursuance of the above objects, and others which will become apparent hereafter, one feature of the invention resides in a mixing valve for fluids which, briefly stated, comprises a valve housing having an internal mixing chamber provided with a bottom wall and an elongated passage extending upwardly from the mixing chamber. At least two fluid conduits are provided each having an outlet in the bottom wall and communicating with the mixing chamber for discharging fluid under pressure into the same. A valve arrangement is provided, including at least two valve members accommodated in the mixing chamber and each movable between a closure position in which it is partially lodged in and closes an associated one of the outlets, and a plurality of opening positions in which it is upwardly displaced out of the associated outlet to different extents. Finally, I also provide a valve control element mounted in the passage turnable and axially displaceable therein and in part projecting beyond the housing for access by a user; the valve control element has an inner end located in the mixing chamber and provided with means for engaging the valve members and urging them to closing position, and for permitting the valve members to move to the respective open positions thereof in dependence upon the composite rotational and axial displacement of the valve control member and in response to the pressure of fluid in the conduits.

The valve members have freedom of movement with reference to one another between their closing and opening positions and are for this purpose advantageously provided on the opposite ends of an arcuate segmental member which preferably is composed at least predominantly of elastomeric material, such as a suitable plastic, and which is mounted against rotation in the mixing chamber overlying the bottom wall thereof so that the valve members in closing position extend into and close the respective openings. Preferably the valve members are unitary with—for instance of one piece with—the segmental element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a fragmentary axial section taken on the line C–D of FIG. 2, on an enlarged scale, showing the valve in closed position;

FIG. 3a is a view similar to FIG. 3 but showing the valve in open position;

FIG. 4 is a top-plan view of a component of the valve in FIGS. 1–3;

FIG. 5 is a side-elevation of the component in FIG. 4;

FIG. 6 is a side-elevation of a further component of the embodiment in FIGS. 1–3; and FIG. 7 is a view similar to FIG. 6 but in partial axial section.

DESCRIPTION OF THE PREFERRED EMBODIMENTS

Figure 1:
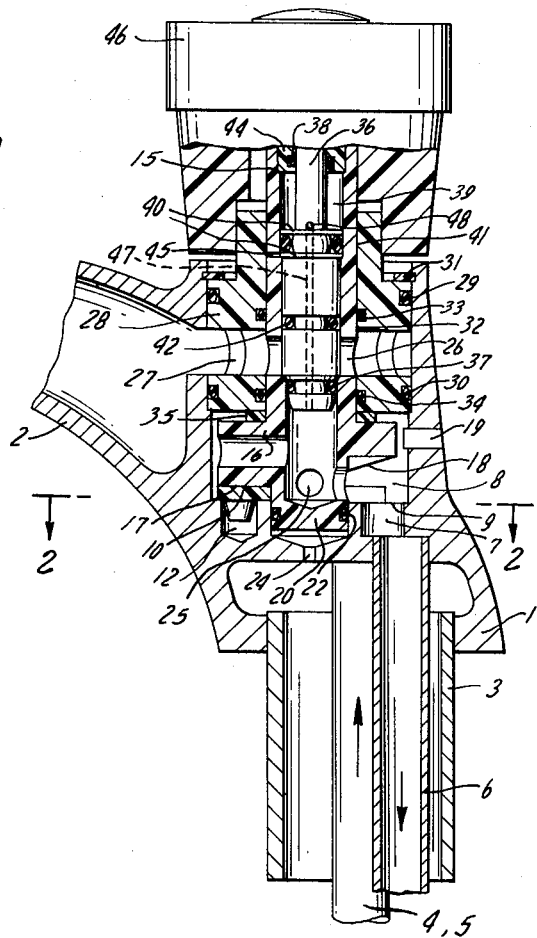
FIG. 1 is an axial section through a mixing valve according to the present invention, with the valve being in completely closed position.

Discussing now FIGS. 1–7 in detail, it is pointed out that reference numeral 1 identifies the valve housing in toto. In conventional manner the valve housing 1 is provided with a spigot 2 which is only fragmentarily shown in FIG. 1 as it is well known. A shaft portion 3 of the valve housing serves for connecting the same in a cutout provided for this purpose in a bathroom lavatory, a kitchen sink or the like.

Reference numerals 4 and 5 identify the supply channels or conduits for cooled or warm water (conduit 5 is concealed behind conduit 4 in FIG. 1) and reference numeral 6 identifies an outlet channel which communicates via a bore 7 with a mixing chamber 8 provided in the interior of the valve housing 1, and from which mixed water at the desired selected temperature is supplied to a kitchen spray, a hair-rinsing spray, or the like.

Figure 2:
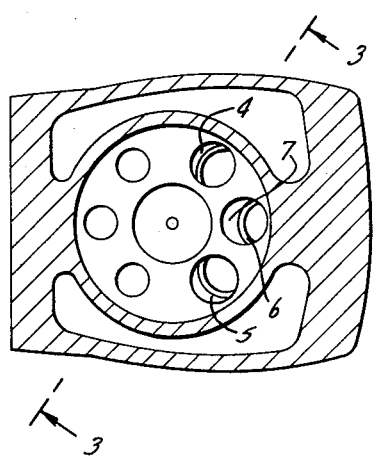
FIG. 2 is a section taken on line A–B of FIG. 1 looking in the direction of the arrows.

As shown in FIG. 1, the mixing chamber 8 has a bottom wall 9 in which the outlets of the conduits 4 and 5 terminate, as evident from FIG. 2. Located in the interior of the mixing chamber 8, overlying the flat bottom wall 9 thereof, is an annular segmental or ring-segmental member 10 of a suitable elastomer, for instance an elastomeric plastic. It is provided with a requisite number of projections—here three—11 each of which extends into a blind bore 12 provided in the bottom wall 9, whereby the member 10 is prevented from rotation within the chamber 8. As FIGS. 4 and 5 show particularly clearly, the member 10 is provided at its opposite ends with two valve members 13 which preferably are unitary with it and which each extend into the respective outlets of the conduits 4 and 5.

Reference numeral 16 is a control cylinder which controls the operation of these valve members 13. It is turnably mounted in a bore 32 of a portion 28 of the housing, and is provided with a guide ring 35 in order to reduce friction between the portion 28 and the cylinder 16. The latter presses with a slight sliding abutment with its control surfaces 17 and 18 upon the member 10, as shown particularly clearly in FIGS. 6 and 7. The surface 17 corresponds to approximately one-third of the circumference of the annular end face constituted of the surfaces 17 and 18, and it is planar; the surface 18 amounts to approximately the remaining two-thirds of the circumference and is configured in a wavy inclined shape, as is particularly evident from a comparison of FIGS. 6 and 7.

Depending upon the angular position of the cylinder 6, one of the valve member 13, the other of the valve members 13 or both of the valve members 13 may thus be free to be displaced inwardly into the chamber 8 in a sense opening the respectively associated outlet of the conduits 4 or 5, as the respective valve members and the member 10 are deflected inwardly under the pressure of water in the respective conduits 4 and 5. The degree, however, to which the valve members are thus inwardly displaced differs in dependence upon the position of the cylinder 16. The rotational movement of the cylinder 16 is limited to approximately 180° by provision of an abutment 19 on the housing 1.

The lower end of the cylinder 16 is provided with the pressure relief or compensating piston 20 which is guided in a bore 23, being sealed with reference to the surrounding wall by an O-ring 22 located in a groove 21 of the piston 20. A relief bore 24 communicates with the bore 23.

The control cylinder 16 is provided with inlet apertures 25 which communicates both with the interior of the cylinder 16 and with the mixing chamber 8. Upwardly above the inlet apertures 25, and diametrally opposite one another, are provided the outlet bores or apertures 26 which are shown particularly in FIGS. 6 and 7 and which communicate with the outlet bores 27 in the portion 28. The cylinder 16 is mounted in the bore 32 of the portion 28 for turning movement, and above and below the bores 26 are provided O-ring seals 33 and 34, respectively, which provide a seal.

The portion 28 is seal-tightly mounted in the housing 1 by means of the O-ring seals 29 and 30 which are located above and below the bores 27, and it is fixed in its position via the spring ring or circlip 31.

A slide member 36 is slidably mounted in bore 14 of the control cylinder 16 and sealed by the O-ring seals 37 and 38. A handle 46 is provided which is fast with the slide member 36 and externally accessible for engagement by a user. By displacing the slide member 36, which can be raised and lowered by gripping the handle 46, the flow-through cross-sections of the bores 26 can be varied and thereby regulated. That portion of the member 36 which is located in the pressure equalizing chamber 39 of the control cylinder 16, is configurated and constructed as a servo pressure piston 40 and provided with O-ring seal 41 and 42. Its displacement in upward direction is limited by the gland 44 which is retained against the abutment 15 and through which the portion of the slide member 36 which extends to the handle 46 passes in sealing relationship. Downward displacement is limited by the abutment 43 provided in the control cylinder 16, where there is also provided a vent or relief bore 45. The handle 46 is fast in known and therefore not separately illustrated manner with the slide member 36; it is also connected with the control cylinder 16 for movement slidable with reference thereto but without having freedom of rotation with reference thereto. This means that when the handle 46 is turned, the control cylinder 16 is similarly turned whereas depressing or pulling up of the handle 46 slides the slide member 36 with reference to the control cylinder 16.

From the description thus far and from a consideration of the drawing the operation of the novel valve according to the present invention will already be obvious. When the handle 46 is turned, the control cylinder 16 similarly turns and its surfaces 17 and 18 slide over the elastomeric ring segment 10. When the inclined surface 18 more or less frees or exposes the ends of the ring segment 10 where the valve members 13 are carried, that is when it assumes the position of FIG. 3a, and when at the same time the slide member 36 is moved to open position, then the heretofore closed valve members 13 are lifted off their respective seats in upward direction into the chamber 8, under the influence of the pressure of water in the conduits 4 and 5. Such displacement can take place to a greater or lesser degree, depending upon the position of the surface 18. Now, warm and cold water from the conduits 4 and 5 enters into the mixing chamber 8 where it becomes admixed and from where it enters the interior of the control cylinder 16.

On the other hand, when the slide member 36 is in closed position, the valve member 13 also will be in closed position as shown in FIG. 3.

Depending upon the angular position of the surfaces 17 nd 18 with reference to the element 10, the valves 13 can be completely closed or opened in varying relationships. By raising or depressing of the handle 46 and thereby the associated slide member 36, the quantity of liquid entering into and then leaving the interior of the control cylinder 16 for passing into the spigot, can be regulated continuously, that is a precise regulation of the flow is possible.

It will be appreciated that the construction according to the present invention is particularly simple, both from a structural point of view as well as from a manufacturing point of view and assembly point of view. Furthermore, it is highly resistant to malfunctions in actual use. All operating components are rotatable components and after the circlip 31 is removed, the entire regulating mechanism of the valve can be removed or inserted subsequently as a unit.

By suitably configuring the surfaces 17 and 18 the possibility is achieved for obtaining an accuracy of regulation—particularly for the normal use temperatures of between 30 and 42°C—which has heretofore eluded the art. It is also an advantage of the construction according to the present invention that the provision of separate one-way valves blocking return flow of water is eliminated, because the elastic ring segment will inherently act in conjunction with the associated valve members 13 as a return flow-blocking instrumentality in the case of pressure differentials in the incoming cold water and warm water supplies.

It will be understood that each of the elements described above, or two or more together, may also find a useful application in other types of constructions differing from the types described above.

While the invention has been illustrated and described as embodied in a mixing valve for fluids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

I claim:

1. A mixing valve for fluids, comprising a valve housing having an internal mixing chamber provided with a bottom wall and an elongated passage extending upwardly from said mixing chamber; at least two fluid conduits each having an outlet in said bottom wall and communicating with said mixing chamber for discharging fluid under pressure into the same; a valve arrangement comprising an arcuate support segment having spaced end portions and overlying said bottom wall and two valve members respectively provided on said end portions and each movable between a closure position in which it is partially lodged in and closes an associated one of said outlets, and a plurality of opening positions in which it is upwardly displaced out of said associated outlet to different extents; and a valve control element mounted in said passage turnable and axially displaceable therein and in part projecting beyond said housing for access by a user, said valve control element having an inner end located in said mixing chamber and provided with means for engaging said valve members and urging them to said closing position, and for permitting said valve members to move to said respective open positions thereof in dependence upon the composite rotational and axial displacement of said valve control member and in response to he pressure of fluid in said conduits.

2. A mixing valve as defined in claim 1, said means including cam means provided on said inner end and operative for engagement with said valve members.

3. A mixing valve as defined in claim 1, said valve members being of substantially conical configuration and each arranged to extend at least in part axially into one of said outlets.

4. A mixing valve as defined in claim 1, wherein aid arcuate segment consists at least predominantly of elastomeric material.

5. A mixing valve as defined in claim 1, wherein said valve members are unitary with said arcuate segment.

6. A mixing valve as defined in claim 1; further comprising rotation-preventing means on said segment and said housing for preventing rotation of the former with reference to he latter in said mixing chamber.

7. A mixing valve as defined in claim 1, said means comprising an annular face surrounding the axis of rotation of said valve control element, said face having a smooth portion extending over substantially one-third over the circumference of said annular face and a wavy portion extending over substantially two-thirds of said circumference.

8. A mixing valve as defined in claim 7, said annular face being an axial endface of said valve control element and facing towards said bottom wall of said chamber.

9. A mixing valve as defined in claim 1, said valve control element being a control cylinder having a central bore, and a plurality of apertures communicating with said central bore and with aid mixing chamber, respectively.

10. A mixing valve as defined in claim 9, said housing comprising a first portion provided with said mixing chamber, and a second portion provided with said passage, and wherein said control cylinder is mounted in said second portion; and further comprising sealing means sealing said housing against escape of fluid through said passage along said control cylinder.

11. A mixing valve as defined in claim 10; and further comprising a spring ring releasably connecting said second portion with said first portion of said housing.

12. A mixing valve as defined in claim 11, wherein said second portion and said valve control element are removable as a unit from said first portion in response to release of said spring ring.

13. A mixing valve as defined in claim 1, said valve control element comprising control cylinder having a central axial bore provided with a plurality of apertures communicating with said bore and said mixing chamber, respectively, and a slide member slidably mounted in said bore for blocking nd unblocking said apertures in dependence upon sliding movement of said slide member with reference to said control cylinder.

14. A mixing valve as defined in claim 13, said valve control element further comprising a pressure-relief piston operatively associated with said slide member.

* * * * *